(No Model.)
J. M. RAUHOFF.
WORM AND WORM GEAR.
No. 597,154.  Patented Jan. 11, 1898.
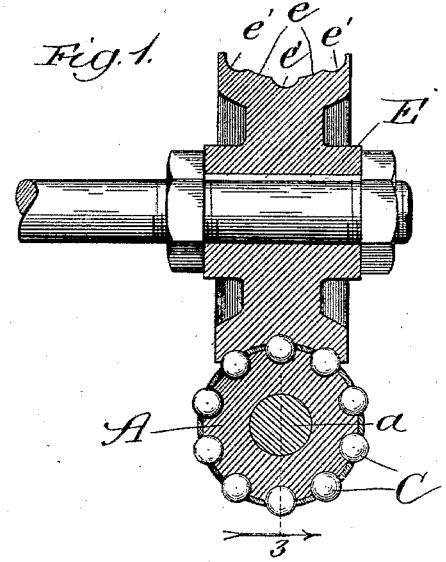
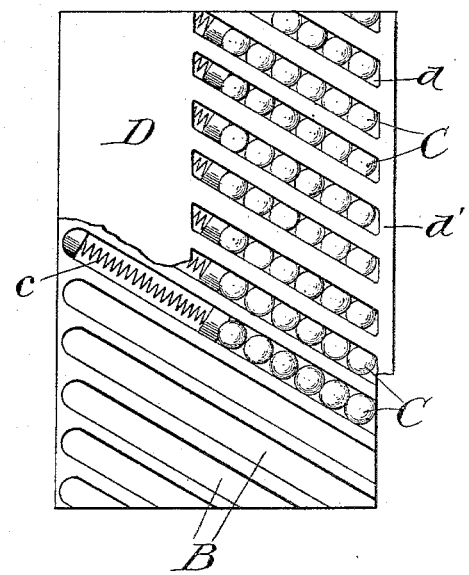
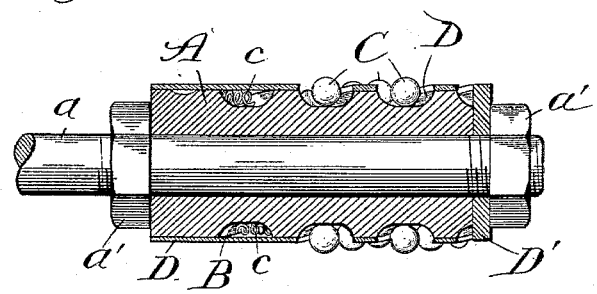
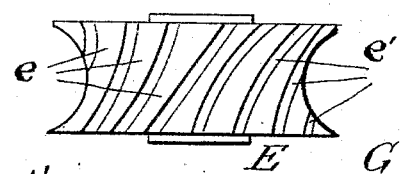
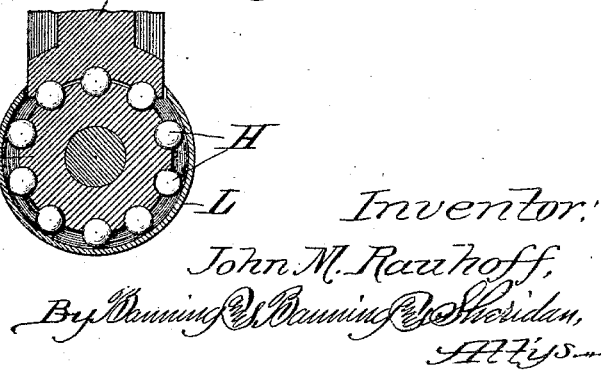
Witnesses:  Inventor:
John M. Rauhoff,
By Banning & Banning & Sheridan,
Attys.

UNITED STATES PATENT OFFICE.

JOHN M. RAUHOFF, OF CHICAGO, ILLINOIS, ASSIGNOR OF ONE-HALF TO THEODORE K. HENDRIE, OF SAME PLACE.

WORM AND WORM-GEAR.

SPECIFICATION forming part of Letters Patent No. 597,154, dated January 11, 1898.

Application filed November 18, 1896. Serial No. 612,541. (No model.)

*To all whom it may concern:*

Be it known that I, JOHN M. RAUHOFF, a citizen of the United States, residing at Chicago, in the county of Cook and State of Illinois, have invented certain new and useful Improvements in Worms and Worm-Gears, of which the following is a specification.

The object of my invention is to provide a worm and worm-gear provided with antifriction devices by which the adhesion and friction of parts are reduced to the lowest possible point; and the invention consists in the features, combinations, and details of construction hereinafter described and claimed.

In the accompanying drawings, Figure 1 is a sectional elevation of a worm and gear fitted with my improvements; Fig. 2, a plan view of the encircling sleeve laid in a flat plane and showing the antifriction-balls in operative position; Fig. 3, a longitudinal sectional view of the worm, taken on line 3 of Fig. 1; Fig. 4, a partial sectional elevation of a modified form hereinafter more fully described, and Fig. 5 is a plan view of the worm-gear shown in Fig. 1.

In the art to which this invention relates it is well known that the transmission of power and speed by means of a worm and gear is expensive in that considerable loss is entailed on account of the enormous friction and adhesion of the parts. To remove this objection by providing an intermediate antifriction device in the shape of balls or spheres and hold the same in operative position is the principal object of my invention.

In constructing a worm and gear in accordance with my improvements I make a worm A and mount it upon any suitable kind of shaft $a$ in any desired manner. In the drawings I have simply shown it as mounted upon a plain shaft and held in place by means of lock-nuts $a'$. It will be understood, however, that it may be held in position in any desired manner, and therefore I do not desire to be limited to any particular kind of worm or method of holding it in position. The worm is provided with the usual helical grooves B, in each of which I mount a series of antifriction-balls C, which are held normally at the operating end of the worm by means of helical coiled springs $c$.

In order to hold the balls in position, so that during the rotation of the worm they will not drop out, I provide an encircling sleeve D, that has a corresponding number of helical slots $d$. This sleeve is arranged at a point outside the diametrical center of the balls, and the slots are of smaller width than the largest diameter of the balls, so that the balls cannot drop out.

From an inspection of Fig. 2 it will be seen that one portion of the sleeve is an imperforate cylinder—that portion which covers the springs—though this is not absolutely necessary, as the sleeve can be slotted its entire length, leaving small end parts $d'$, which act as shoulders for the balls to rest against and prevent their running out of the ends of the helical grooves. This sleeve can be held in position in any suitable manner, though I prefer to use a washer D' for the purpose, which is inserted between the worm and one of the lock-nuts, preferably at that end opposite to the helical coiled springs.

The worm-gear E is provided with a number of teeth or projections $e$, that form depressions $e'$.

In operation the parts are brought together, as shown in Fig. 1, so that the antifriction-balls enter the depressions in the worm-gear and form not only the antifriction device, but also the means for transmitting power or motion from one part to the other. When the worm is started, if that be the driving medium, the balls will immediately make rolling contact with and transmit the power to the worm teeth or projections. At the same time they will roll back in the grooves of the worm against the tension of the helical spring until they have passed out of contact by the rotation of the worm-gear, when they will immediately return to their normal position by the action of the helical springs, as shown in Fig. 2.

In Fig. 4 I have shown a modification in which the worm G is provided with the requisite number of helical grooves and with a desired number of balls H. An encircling sleeve I is provided that surrounds these balls and has an opening in one portion to enable the worm-gear K to enter into engagement with the balls. A set of helical coiled springs is provided, located in substantially the same manner as shown in Fig. 2, and the sleeve I encircles and forms a casing for the springs and balls and prevents their displacement. The operation of the parts is exactly the same as that described in connection with the first three figures of the drawings.

While I have described my invention with more or less minuteness as regards details and as being embodied in certain precise forms, I do not desire to be limited thereto unduly any more than is pointed out in the claims. On the contrary, I contemplate all proper changes in form, construction, and arrangement, the omission of immaterial elements, and the substitution of equivalents, as circumstances may suggest or render expedient.

I claim—

1. In mechanism of the class described, the combination of a worm, a worm-gear, a set of balls in each of the helical grooves of the worm, spring mechanism for normally holding the balls together at one end of each of the grooves, so that the balls form a set of antifriction-teeth between the worm and gear, and means for holding the balls in operative position, substantially as described.

2. In mechanism of the class described, the combination of a worm, a worm-gear, a set of antifriction-balls in each of the helical grooves of the worm, helical coiled springs to normally keep the balls together and in operative position at one end of the worm, and an encircling sleeve for holding the balls at all times in engagement with the worm-grooves, substantially as described.

3. In mechanism of the class described, the combination of a worm, a worm-gear, a set of antifriction-balls in each of the helical grooves of the worm, helical coiled springs for normally holding the balls in operative position at one end of the worm, and a helically-slotted encircling sleeve for holding the balls in operative position on the worm at all times, substantially as described.

JOHN M. RAUHOFF.

Witnesses:
THOMAS F. SHERIDAN,
THEODORE K. HENDRIE.